United States Patent
Al-Bakri et al.

(10) Patent No.: US 8,340,675 B2
(45) Date of Patent: Dec. 25, 2012

(54) RADIO BEARER MANAGEMENT IN A CELLULAR COMMUNICATION SYSTEM

(75) Inventors: Ban Al-Bakri, Maritime (FR); Pete Randall, Gloucestershire (GB)

(73) Assignee: Motorola Mobility, Inc., Libertyville, IL (US)

( * ) Notice: Subject to any disclaimer, the term of this patent is extended or adjusted under 35 U.S.C. 154(b) by 1124 days.

(21) Appl. No.: 12/064,981

(22) PCT Filed: Sep. 30, 2006

(86) PCT No.: PCT/US2006/038715
§ 371 (c)(1),
(2), (4) Date: Feb. 27, 2008

(87) PCT Pub. No.: WO2007/055837
PCT Pub. Date: May 18, 2007

(65) Prior Publication Data
US 2008/0248804 A1    Oct. 9, 2008

(30) Foreign Application Priority Data
Oct. 28, 2005  (GB) .................................. 0522025.6

(51) Int. Cl.
*H04W 72/00* (2009.01)

(52) U.S. Cl. ...................... 455/450; 455/426.2; 455/544; 455/452.1; 455/437; 455/449; 455/462; 455/466; 455/432.3; 455/436; 455/447; 370/312; 370/328; 370/395.21; 370/352; 370/324; 709/231

(58) Field of Classification Search ............... 455/426.2, 455/544, 3.01, 452.2, 1, 437, 449, 426.1, 455/462, 466, 432.3, 436, 447, 561; 370/312, 370/328, 395.21; 709/231
See application file for complete search history.

(56) References Cited

U.S. PATENT DOCUMENTS

| 7,039,416 | B2 | 5/2006 | Stumpert et al. |
| 7,127,253 | B2 * | 10/2006 | Chen .............................. 455/449 |
| 7,747,213 | B2 * | 6/2010 | Van Lieshout et al. ....... 455/3.01 |
| 7,907,952 | B2 * | 3/2011 | Lee et al. .................... 455/452.2 |
| 2002/0006780 | A1 | 1/2002 | Bjelland et al. |

(Continued)

FOREIGN PATENT DOCUMENTS

WO    0237753 A2    5/2002

(Continued)

OTHER PUBLICATIONS

Supplementary European Search Report, Munich, Apr. 12, 2012, all pages.

*Primary Examiner* — Joseph Arevalo

(57) ABSTRACT

A cellular communication system comprises a network based radio bearer controller (123) which is arranged to control and manage the setup and operation of radio bearers. The radio bearer controller comprises a RAB processor (201) which is arranged to set up a plurality of user plane radio bearers for a user equipment (101). The plurality of user plane radio bearers all support a common service. The radio bearer controller (123) further comprises a link processor (203) which links the plurality of user plane radio bearers. The radio bearer controller (123) can process linked user plane radio bearers in relation to each other, for example by terminating all linked user plane radio bearers if a single radio bearer fails. The invention may be particularly suitable for a UMTS (Universal Mobile Telecommunication System) communication system supporting services using a plurality of UMTS user plane radio bearers.

7 Claims, 3 Drawing Sheets

U.S. PATENT DOCUMENTS

| | | | |
|---|---|---|---|
| 2002/0037749 A1* | 3/2002 | Wager | 455/561 |
| 2002/0199008 A1* | 12/2002 | Pecen et al. | 709/231 |
| 2004/0132455 A1 | 7/2004 | Stumpert et al. | |
| 2004/0156334 A1 | 8/2004 | Okubo | |
| 2004/0162074 A1* | 8/2004 | Chen | 455/437 |
| 2005/0101245 A1* | 5/2005 | Ahmavaara | 455/1 |
| 2005/0174956 A1* | 8/2005 | Yi et al. | 370/312 |
| 2006/0068793 A1* | 3/2006 | Van Lieshout et al. | 455/444 |
| 2007/0105549 A1* | 5/2007 | Suda et al. | 455/426.2 |
| 2007/0121542 A1* | 5/2007 | Lohr et al. | 370/329 |

FOREIGN PATENT DOCUMENTS

| | | |
|---|---|---|
| WO | 02069659 A1 | 9/2002 |
| WO | 03088693 A1 | 10/2003 |
| WO | 2004059997 A1 | 7/2004 |
| WO | WO 2005051024 A1 * | 6/2005 |

\* cited by examiner

RADIO BEARER MANAGEMENT IN A CELLULAR COMMUNICATION SYSTEM

FIELD OF THE INVENTION

The invention relates to radio bearer management in a cellular communication system and in particular, but not exclusively, to radio bearer management in a Universal Mobile Telecommunication System (UMTS).

BACKGROUND OF THE INVENTION

Currently, the most ubiquitous cellular communication system is the 2nd generation communication system known as the Global System for Mobile communication (GSM). Further description of the GSM TDMA communication system can be found in 'The GSM System for Mobile Communications' by Michel Mouly and Marie Bernadette Pautet, Bay Foreign Language Books, 1992, ISBN 2950719007.

To further enhance the services and performance of the GSM communication system, a number of enhancements and additions have been introduced to the GSM communication system over the years.

One such enhancement is the General Packet Radio System (GPRS), which is a system developed for enabling packet data based communication in a GSM communication system. Thus, the GPRS system is compatible with the GSM (voice) system and provides a number of additional services including provision of packet data communication, which augments and complements the circuit switched communication of a traditional communication system. Furthermore, the packet based data communication may also support packet based speech services. The GPRS system has been standardised as an add-on to an existing GSM communication system, and can be introduced to an existing GSM communication system by introducing new network elements. Specifically, a number of Serving GPRS Support Nodes (SGSN) and Gateway GPRS Support Nodes (GGSN) may be introduced to provide a packet based fixed network communication.

3rd generation systems are currently being rolled out to further enhance the communication services provided to mobile users. One such system is the Universal Mobile Telecommunication System (UMTS), which is currently being deployed. Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876. The core network of UMTS is built on the use of SGSNs and GGSNs thereby providing commonality with GPRS.

Cellular communication systems generally support services by the creation and allocation of logical and physical radio bearers. For example, radio bearers may be set up in support of signalling and user data communications for a given service provided to a user equipment.

Specifically, UMTS and GPRS operate with the concept of Radio Access Bearers (RAB) which provide a communication connection from the user equipments to the core network.

These RABs may either be UMTS signalling plane RABs which support UMTS signalling information or can be UMTS user plane RABs which support user data traffic. In UMTS, the UMTS signalling plane RABs support standardised UMTS signalling data required by the operation and management of the UMTS system. For example, mobility management and call control is supported by signalling using UMTS signalling plane RABs. In contrast, the UMTS user plane RABs provide a bearer which can be freely used for any data by the specific service. Thus, the data transmitted on UMTS user plane RABs is independent of the UMTS cellular communication system and can be used by the application in any suitable way (the UMTS user plane RAB can be considered a bit pipe for the user data of the service).

In some systems, such as UMTS, a given user equipment or service can be supported by a UMTS signalling plane RAB and one or more UMTS user plane RABs. The UMTS signalling plane RAB is used to control and manage the service by the UMTS cellular communication system. The UMTS user plane RABs are used exclusively by the service and the plurality of UMTS user plane RABs can for example be used for different data types supporting the same communication, e.g. one bearer may be used for video communication and another for audio communication. Furthermore, for many services, additional signalling is required between e.g. a server and an application running on the user equipment. In such cases, a UMTS user plane RAB can be allocated specifically to support this signalling whereas another UMTS user plane RAB can be used for the application user data itself. Thus, the UMTS user plane RABs for a given service can be divided into one or more service signalling plane RABs and one or more service user plane RABs.

Specifically, a service known as IMS (IP Multimedia Subsystem) is developed for allowing efficient Multimedia Internet access for user equipments of a UMTS cellular communication system. In order to set up an IMS service, a minimum of one UMTS signalling plane RAB and two UMTS user plane RABs are required. The UMTS signalling plane RAB supports the required UMTS signalling whereas one UMTS user plane RAB is used as an IMS signalling plane RAB that supports the signalling for the IMS service and another UMTS user plane RAB is used as an IMS user plane RAB for communicating the user data.

However, although the use of multiple UMTS user plane RABs provides a flexible system for supporting different aspects of a given service, it also tends to result in a complex and inefficient management of the radio bearers and the air interface resource. Specifically, each UMTS user plane RAB is managed and controlled individually resulting in complex procedures for setting up and terminating a service using a plurality of UMTS user plane RABs. It also tends to result in an inefficient management and in a system which is sensitive to errors or fault conditions.

Hence, an improved radio bearer management would be advantageous and in particular radio bearer management allowing increased flexibility, improved efficiency, facilitated radio bearer management and/or improved radio bearer management would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided a cellular communication system comprising a network based radio bearer controller, the radio bearer controller comprising: means for setting up a plurality of user plane radio bearers for a user equipment, the plurality of user plane radio bearers supporting a common service; and means for linking the plurality of user plane radio bearers.

The invention may allow improved radio bearer management. In particular, the invention may allow an improved management of user plane radio bearers supporting a common service and may e.g. allow facilitated management, reduced complexity, improved error performance and/or improved air interface resource utilisation.

For example, the common service can be a service using a first user plane radio bearer for signalling data and the second user plane radio bearer for user data. If the first user plane radio bearer fails and the common service cannot be supported in the absence of the signalling data, the radio bearer controller can automatically terminate the second user plane radio bearer and thereby free up the resource allocation used by the second user plane radio bearer.

According to an optional feature of the invention, the linking is an indication of a dependency between the user plane radio bearers.

This may allow improved and/or facilitated radio bearer management. The dependency can indicate a dependency of one or more radio bearers on the existence of one or more other radio bearers. For example, the dependency may reflect which radio bearers cannot usefully be used by the common service without the existence of which specific other radio bearers.

According to an optional feature of the invention, the linking represents a hierarchical interrelation between the plurality of user plane radio bearers.

This may allow improved and/or facilitated radio bearer management. The hierarchical interrelation can indicate how different radio bearers require other radio bearers in order to be used by the common service.

According to an optional feature of the invention, the radio bearer controller comprises means for modifying a parameter of a first user plane radio bearer of the plurality of user plane radio bearers in response to a detection of a change in a characteristic of a second user plane radio bearer of the plurality of user plane radio bearers.

This may allow improved and/or facilitated radio bearer management. In particular, it may allow improved adaptation of the combined communication provision to the current conditions. The modification of the parameter of the first user plane radio bearer may be performed without any other external input and may be determined based on a locally determined characteristic for the second user plane radio bearer. The linking of the user plane radio bearers may thus be such that a change in the second user plane radio bearer automatically causes a parameter change for the first user plane radio bearer.

The modification of the parameter of the first user plane radio bearer may be delayed with respect to the detection of the change in the characteristic of the second user plane radio bearer.

According to an optional feature of the invention, the change in the characteristic of the second user plane radio bearer corresponds to a termination of the second user plane radio bearer.

This may allow improved and/or facilitated radio bearer management. The feature may e.g. allow increased flexibility and/or improved performance. For example, in the event of a termination (e.g. a failure due to poor radio conditions) of the second user plane radio bearer, the first user plane radio bearer may be reconfigured in order to allow it to support the communication previously supported by the second user plane radio bearer.

According to an optional feature of the invention, the modifying of the parameter of the first user plane radio bearer corresponds to termination of the first user plane radio bearer.

This may allow improved and/or facilitated radio bearer management. The feature may allow a more efficient resource utilisation for example by allowing a radio bearer to be terminated if it cannot be used by the common service due to the termination of another user plane radio bearer. The termination of the second user plane radio bearer may be an automated termination by the radio bearer controller.

According to an optional feature of the invention, the modifying means comprises means for requesting a release of the first user plane radio bearer in response to a detection of a termination of the second user plane radio bearer.

This may allow efficient performance and/or may provide compatibility with existing network elements of a cellular communication system such as UMTS. For example, the radio bearer controller in a UMTS cellular communication system may be implemented in a Radio Network Controller and may transmit a RAB release request message to an SGSN and/or a GGSN.

According to an optional feature of the invention, the cellular communication system comprises context means for setting up a packet data context for each of the plurality of user plane radio bearers, each packet data context being associated with the same Internet access point.

This may allow efficient performance and/or may provide compatibility with existing network elements of a cellular communication system such as UMTS. The packet data context may for example be a Packet Data Protocol (PDP) Context set up by an SGSN or a GGSN.

According to an optional feature of the invention, the user equipment comprises means for initiating the common service by initially requesting a first packet data context and requesting a secondary packet data context following an assignment of a primary user plane radio bearer for the first packet data context.

This may allow efficient performance and/or may provide compatibility with existing network elements of a cellular communication system such as UMTS.

According to an optional feature of the invention, the context means is arranged to request a setup of a secondary user plane radio bearer from the radio bearer controller in response to a detection of an access point identifier for the second packet data context corresponding to an access point identifier for the first packet data context.

The feature may allow a particular efficient, practical and/or reliable way of detecting radio bearers that can be linked. The feature may allow efficient performance and/or may improve compatibility with existing cellular communication systems such as UMTS According to an optional feature of the invention, the context means is arranged to include a linking indication for the primary user plane radio bearer and the secondary user plane radio bearer in a radio bearer setup request message for the secondary user plane radio bearer.

The feature may allow efficient performance and/or may improve compatibility with existing cellular communication systems such as UMTS. The radio bearer setup request message may be communicated to the radio bearer controller from the context means. In a UMTS cellular communication system the radio bearer controller may be an RNC and the context means may be an SGSN/GGSN and the radio bearer setup request message may be a RANAB RAB Assignment Request message.

According to an optional feature of the invention, the cellular communication system further comprises a server for the common service arranged to use at least one of the plurality of user plane radio bearers as a signalling radio bearer.

The invention may allow a particular advantageous performance for supporting nested and separated signalling wherein the cellular communication system provides user plane radio bearers being suitable for further division into service signalling and service user data plane radio bearers. This may facilitate operation and management by increasing the separation of cellular communication system management functionality and signalling and specific service management functionality and signalling.

According to an optional feature of the invention, the cellular communication system is a $3^{rd}$ Generation cellular communication system.

The invention may allow particularly advantageous performance in a $3^{rd}$ Generation cellular communication system such as UMTS.

According to an optional feature of the invention, the plurality of user plane radio bearers are UMTS user plane radio bearers.

The invention may allow particularly improved management of UMTS user plane radio bearers.

According to an optional feature of the invention, the common service is an IP Multimedia Subsystem (IMS) service.

The invention may allow particularly advantageous support of IMS services resulting in an improved service, facilitated operation and/or reduced resource usage.

According to a second aspect of the invention, there is provided a radio bearer controller for a fixed network of a cellular communication system, the radio bearer controller comprising: means for setting up a plurality of user plane radio bearers for a user equipment, the plurality of user plane radio bearers supporting a common service; and means for linking the plurality of user plane radio bearers.

According to a second aspect of the invention, there is provided a method of radio bearer management for a cellular communication system comprising a network based radio bearer controller, the method comprising at the radio bearer controller performing the steps of: setting up a plurality of user plane radio bearers for a user equipment, the plurality of user plane radio bearers supporting a common service; and linking the plurality of user plane radio bearers.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a UMTS cellular communication system. However, it will be appreciated that the invention is not limited to this application but may be applied to many other communication systems including for example GSM/GPRS cellular communication systems.

Figure 1:
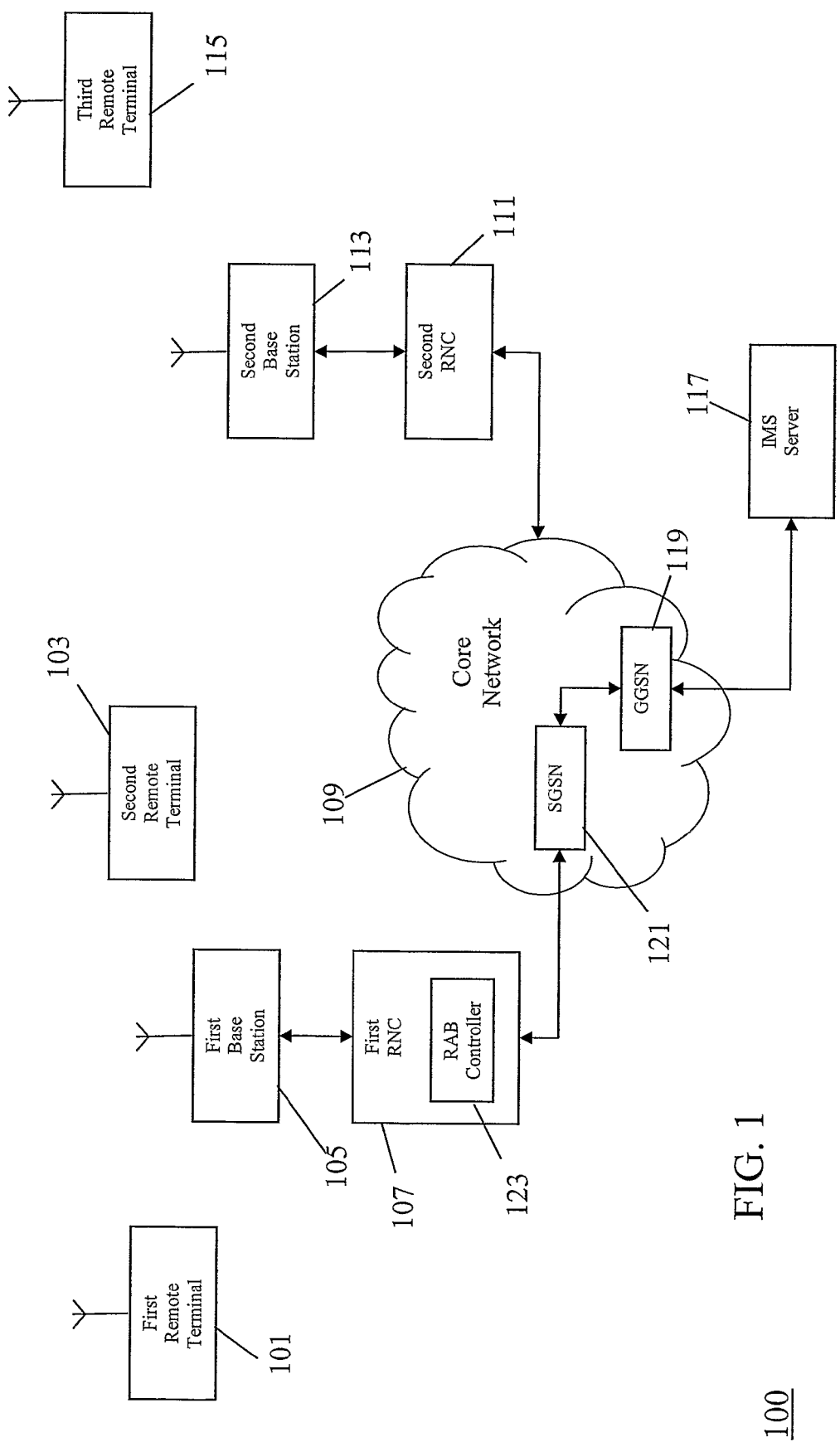
FIG. 1 illustrates an example of a UMTS cellular communication system in accordance with some embodiments of the invention.

FIG. 1 illustrates an example of a UMTS cellular communication system 100 in accordance with some embodiments of the invention.

In a cellular communication system, a geographical region is divided into a number of cells each of which is served by a base station. The base stations are interconnected by a fixed network which can communicate data between the base stations. A user equipment (e.g. a 3G User Equipment (UE) or a mobile station) is served via a radio communication link by the base station of the cell within which the user equipment is situated.

As a user equipment moves, it may move from the coverage of one base station to the coverage of another, i.e. from one cell to another. As the user equipment moves towards a base station, it enters a region of overlapping coverage of two base stations and within this overlap region it changes to be supported by the new base station. As the user equipment moves further into the new cell, it continues to be supported by the new base station. This is known as a handover or handoff of a user equipment between cells.

A typical cellular communication system extends coverage over typically an entire country and comprises hundreds or even thousands of cells supporting thousands or even millions of user equipments. Communication from a user equipment to a base station is known as uplink, and communication from a base station to a user equipment is known as downlink.

In the example of FIG. 1, a first user equipment 101 and a second user equipment 103 are in a first cell supported by a first base station 105.

The first base station 105 is coupled to a first RNC 107. An RNC performs many of the control functions related to the air interface including radio resource management and routing of data to and from appropriate base stations.

The first RNC 107 is coupled to a core network 109. A core network interconnects RNCs and is operable to route data between any two RNCs, thereby enabling a user equipment in a cell to communicate with a user equipment in any other cell. In addition, a core network comprises gateway functions for interconnecting to external networks such as the Public Switched Telephone Network (PSTN), thereby allowing user equipments to communicate with landline telephones and other communication terminals connected by a landline. Furthermore, the core network comprises much of the functionality required for managing a conventional cellular communication network including functionality for routing data, admission control, resource allocation, subscriber billing, user equipment authentication etc.

The core network 109 is further coupled to a second RNC 111 which is coupled to a second base station 113. The second base station 113 supports a third user equipment 115.

It will be appreciated that although FIG. 1 for brevity and clarity illustrates only two RNCS, two base stations and three user equipments a practical cellular communication system will typically comprises a large number of RNCs, base stations and user equipments.

In the example of FIG. 1, the first user equipment 101 initiates an IMS service supported by the UMTS communication system. An IMS service can be a voice call or any multimedia call/session. Also more than one application is possible per user equipment with one IMS signalling connection from the same internet access point.

In order to support the IMS service, the cellular communication system 100 comprises an IMS server 117 which is coupled to the core network 109. Specifically in the example of FIG. 1, the IMS server 117 is coupled to a GGSN 119. The GGSN 119 is coupled to a SGSN 121 which is a serving SGSN for the first RNC 107.

In the example, the first RNC 107 comprises a RAB controller 123 which is arranged to control the setup, management and termination of radio bearers for the base stations and user equipments supported by the first RNC.

Specifically, when initiating the IMS service for the first user equipment 101, standard UMTS signalling is used to set up a first UMTS signalling plane radio bearer for the first user equipment 101. This UMTS signalling plane radio bearer is then used for signalling to set up a second radio bearer which specifically is as UMTS user plane radio bearer that can be used by an application or service for user data traffic. This UMTS user plane radio bearer can be used to support any data under the control of the application and the specific nature of the data carried by the UMTS user plane radio bearer does not affect the operation of the UMTS cellular communication system itself.

In the example, a first UMTS user plane radio bearer is set up to support the IMS service and is used by the first user equipment 101 and the IMS server 117 for signalling data. Thus, the first UMTS user plane radio bearer is used as an IMS signalling plane radio bearer that supports the operation and maintenance of the IMS service between the first user equipment 101 and the IMS server 117.

The first UMTS user plane radio bearer is then used for signalling in order to instigate the setup of an IMS user plane radio bearer. Specifically the IMS server 117 requests that a second UMTS user plane radio bearer is set up by the RAB controller 123. This second UMTS user plane radio bearer is then used for the user data of the IMS service. The first user equipment 101 and/or the IMS server 117 may continue to instigate the setup of further UMTS user plane radio bearers that may be used as IMS user plane radio bearers.

Figure 2:
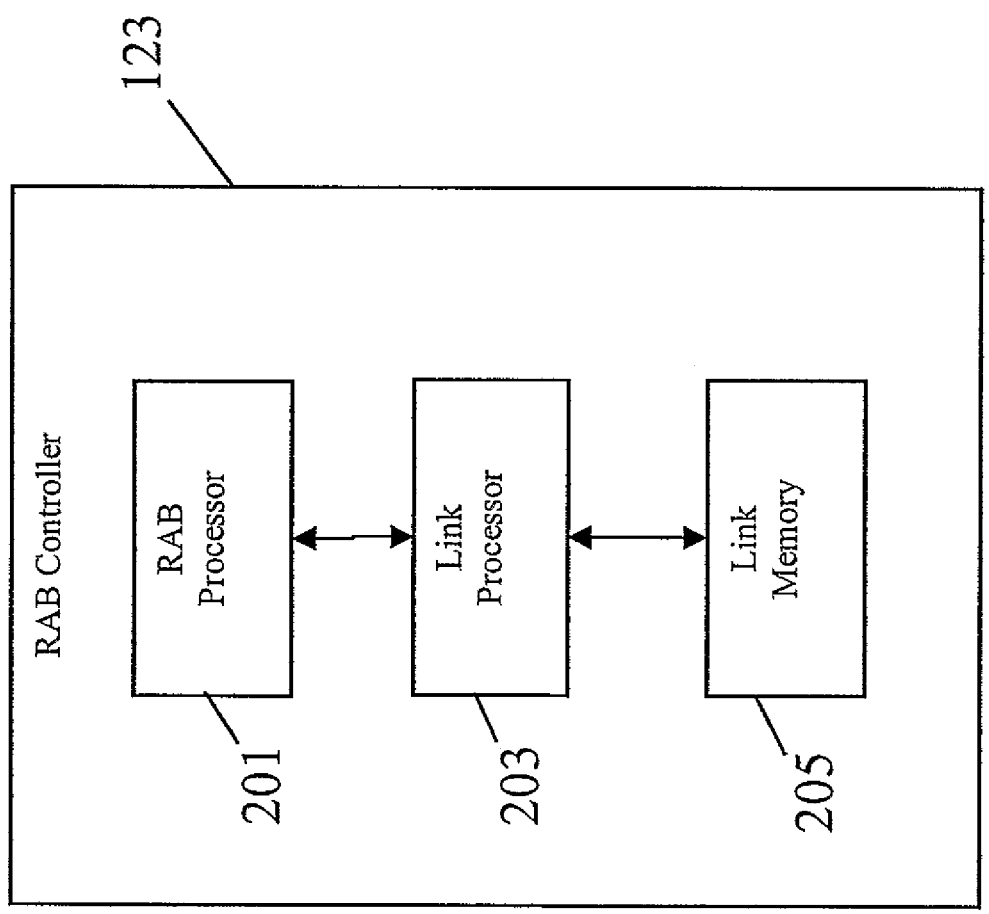
FIG. 2 illustrates an example of a radio bearer controller in accordance with some embodiments of the invention.

FIG. 2 illustrates an example of a RAB controller 123 in accordance with some embodiments of the invention.

The RAB controller 123 comprises a RAB processor 201 which is arranged to manage and control the radio bearers of the base stations supported by the first RNC 107. Specifically the RAB processor 201 can set up the plurality of UMTS user plane radio bearers for the first user equipment 101 in support of the IMS service.

The RAB processor 201 is coupled to a link processor 203 which is arranged to link the plurality of UMTS user plane radio bearers. In particular, when the RAB processor 201 sets up a new UMTS user plane radio bearer, it provides this information to the link processor 203. The link processor 203 then determines if this new UMTS user plane radio bearer should be linked to an already existing UMTS user plane radio bearer. For example, if an IMS signalling plane radio bearer has already been set up as the first UMTS user plane radio bearer, the setup of a second UMTS user plane radio bearer for the IMS service will result in a determination by the link processor 203 that the two UMTS user plane radio bearers are for the same service and should be linked together.

The link processor 203 is coupled to a link memory 205 in which the link information is stored. Thus, if the link processor 203 determines that the first and second UMTS user plane radio bearers are linked together, an identification of the two UMTS user plane radio bearers can be stored together in the link memory 205.

Accordingly, the RAB controller 123 can subsequently process the two UMTS user plane radio bearers together or can automatically determine how changes to one UMTS user plane radio bearer may affect the management of another UMTS user plane radio bearer.

For example, if the first UMTS user plane radio bearer (which is used as an IMS signalling plane radio bearer) fails due to poor propagation conditions, this will be detected by the RAB processor 201 which accordingly will terminate the first UMTS user plane radio bearer. However, as the IMS service cannot be supported without the IMS signalling plane radio bearer, there is no advantage in maintaining the second UMTS user plane radio bearer. Thus, when the RAB processor 201 detects that the first UMTS user plane radio bearer has failed, it feeds the identity of this radio bearer to the link processor 203. The link processor 203 accesses the link memory 205 to determine if there are any other UMTS user plane radio bearers linked to the failed UMTS user plane radio bearer. In the specific example, the link memory 205 returns the identification of the second UMTS user plane radio bearer. This identification is then fed from the link processor 203 to the RAB processor 201. In response, the RAB processor 201 proceeds to terminate (or request termination) of the second user plane radio bearer. The resource used by the second UMTS user plane radio bearer can then be used for other services.

Thus, the system of FIGS. 1 and 2 allows user plane radio bearers to be logically linked in the RNC so that they can be mutually maintained and managed. Specifically, the radio bearer management may take into account that the radio performance on one UMTS user plane radio bearer may impact the linked UMTS user plane radio bearers.

Figure 3:
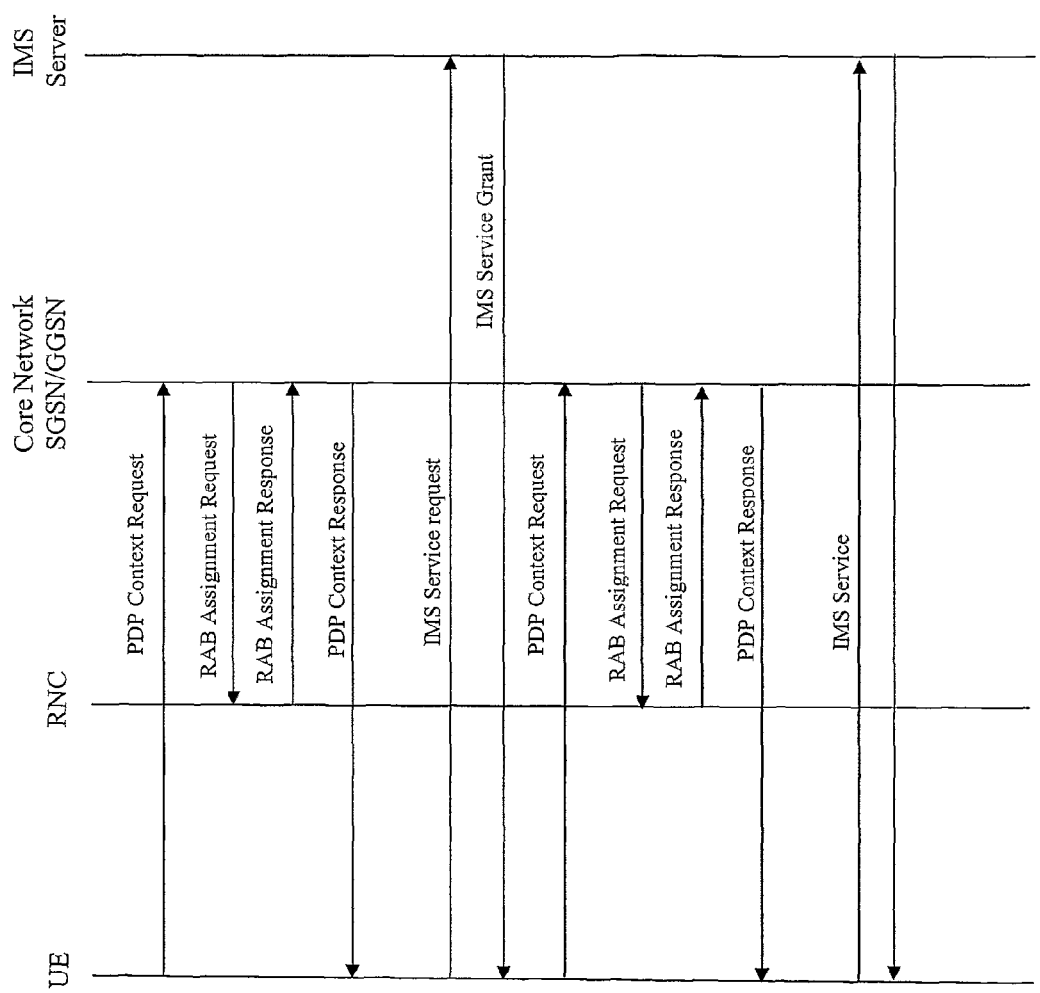
FIG. 3 illustrates an example of a simplified signaling flow diagram for the setup of an IMS service in a cellular communication system.

FIG. 3 illustrates an example of a simplified signaling flow diagram for the setup of an IMS service in a UMTS cellular communication system. In the following, the exemplary setup will be described with reference to the first user equipment 101 of FIG. 1. It will be appreciated that for clarity and brevity, only the signaling required for the description is illustrated in FIG. 3 and that a practical UMTS IMS setup may include more detailed and/or additional signaling.

Initially, when the first user equipment 101 is switched on, it signals with the UMTS fixed network to setup a UMTS signaling plane radio bearer. When the user equipment 101 subsequently proceeds to initiate an IMS service it sends a PDP context request to the core network using the UMTS signaling plane radio bearer (in FIG. 3 the functionality of a UMTS GGSN and SGSN are merged into a single entity of the core network. It will be appreciated that any suitable split of functionality may be used).

Accordingly, the user equipment 101 sends a PDP context request to the core network requesting that a PDP context is set up for the IMS service. This PDP context will be a primary PDP context which is associated with a first UMTS user plane radio bearer.

Each PDP context is associated with a single UMTS user plane radio bearer and provides an access point to the Internet. Specifically, the PDP context request comprises an Access Point Name (APN) for an access point to the Internet.

In response to receiving the PDP context request, the core network proceeds to request the RAB controller 103 of the first RNC 107 to set up a suitable UMTS user plane radio bearer. Specifically, the core network transmits a (RANAP) RAB assignment request to the first RNC 107. This RAB Assignment Request message does not comprise any indication of any other linked UMTS user plane radio bearers.

The RAB controller 103 then proceeds to setup the first UMTS user plane radio bearer henceforth referred to as RAB #1. When this has been successfully achieved, it transmits a RAB Assignment Response to the core network.

In response to receiving the RAB Assignment Response, the core network proceeds to transmit a PDP context response message which informs the user equipment 101 of the successful setup of the PDP context. This PDP context is a primary PDP context and is associated with the first UMTS user plane radio bearer. This is subsequently used as an IMS signaling plane radio bearer for signaling between the first user equipment 101 and the IMS server 117.

The receipt of the PDP context response message indicates to the first user equipment 101 that the system is ready for an IMS service request and that an IMS signaling plane radio bearer has been setup. In response, the first user equipment 101 proceeds to send an IMS service request to the IMS server 117 using the IMS signaling plane radio bearer (RAB#1). In response, the IMS server 117 transmits a service grant which indicates that the IMS service can be initiated.

When the first user equipment 101 receives the IMS service grant it proceeds to request a second PDP context for a second UMTS user plane radio bearer. This second UMTS user plane radio bearer will be used as an IMS user plane radio bearer that transports the IMS user plane traffic (e.g. audio data).

Thus, in the example the first user equipment 101 proceeds to send a second PDP context for the second UMTS user plane radio bearer, RAB#2. When this PDP context is received by the core network, it proceeds to transmit a RAB assignment request to the first RNC 107 in response to which the RAB controller 123 proceeds to setup the UMTS user plane radio bearer and to respond by transmitting a RAB Assignment Response to the core network.

However, in addition to setting up the second UMTS user plane radio bearer, the RAB controller 123 also detects that this second UMTS user plane radio bearer is used for the same service as the first user plane radio bearer. Accordingly, it proceeds to link the first and second UMTS user plane radio bearers and it stores the identity of the two radio bearers as associated identities in the link memory 207.

Thus, a new UMTS user plane radio bearer, RAB#2, is established and linked to the first UMTS user plane radio bearer, RAB#1.

When receiving the RAB Assignment Response, the core network proceeds to transmit a PDP context response to the first user equipment 101. This PDP context will be a secondary PDP context for the service. Subsequently the IMS service proceeds using the first UMTS user plane radio bearer, RAB#1, as a signaling radio bearer and the second UMTS user plane radio bearer, RAB#2, for transporting user traffic.

It will be appreciated that any suitable algorithm or method of determining which radio bearers are to be linked may be applied without detracting from the invention.

In the example of FIG. 1 to 3, the core network evaluates the APN for all PDP context requests. If a second PDP context is received with the same APN as an already existing PDP context, it is considered that these relate to the same common service and should be linked. This information is accordingly provided to the first RNC 107 where it is further processed by the link processor 203.

Thus, information that a subsequent RAB establishment is linked to a previous RAB establishment is communicated to the first RNC 107.

In UMTS embodiments, the UMTS RANAP RAB Request message (corresponding to the RAB assignment request of FIG. 3) can contain such information in specific information elements (IEs). As an example, when the first UMTS user plane radio bearer is established, the identity of this is communicated from the core network (specifically from the SGSN) to the first RNC 107 and to the first user equipment 101 in the RANAP RAB Request and RRC Radio Bearer Setup messages. This provides the first RNC 107 and the first user equipment 101 with identification information for the UMTS user plane radio bearer that has just been set up. Then, in any subsequent UMTS user plane radio bearer establishment related to the previously established UMTS user plane radio bearer(s), an optional IE can be added to the RANAP RAB Request message containing identifications of UMTS user plane radio bearers that the new UMTS user plane radio bearer is dependent on an accordingly should be linked with.

As a specific example, the RANAP RAB Request message may be augmented to contain Information Elements that communicate the relationship information from the SGSN to the RNC.

In some embodiments, the release of all or selected related UMTS user plane radio bearers can also be achieved in a single message which identifies the UMTS user plane radio bearers to be released—e.g. if the core network releases one UMTS user plane radio bearer, all linked UMTS user plane radio bearers may also automatically be released.

The linking of different UMTS user plane radio bearers can be a simple linking then indicates that the UMTS user plane radio bearers should be treated as a common group. However, in other embodiments the linking may be more complex and can specifically reflect a dependency between the UMTS user plane radio bearers. For example, the linking may reflect that an IMS user plane radio bearer cannot be used without the corresponding IMS signaling plane radio bearer whereas the IMS signaling plane radio bearer can be used without the corresponding IMS user plane radio bearer (for example to set up a new IMS user plane radio bearer).

Indeed in some embodiments the linking can represent a complex hierarchy of interrelations and interdependencies between the different UMTS user plane radio bearers. For example, the linking information stored in the linking memory 207 can be structured as a tree structure wherein all radio bearers below a given node of the tree requires the presence of the UMTS user plane radio bearer of the node. Thus, if a UMTS user plane radio bearer fails, all UMTS user plane radio bearers depending from this UMTS user plane radio bearer in the tree structure may automatically be terminated.

As a specific example a third UMTS user plane radio bearer, RAB#3, may be established for the transport of a different type of user plane traffic (e.g. a presentation to go along with the audio). This new radio bearer may be created to be dependent on both the IMS signaling plane radio bearer RAB#1 and the first IMS user plane radio bearer RAB#2. This can be done as follows. The RAB Assignment Request message is used to create RAB #3. The list of enabling radio bearers can contain the IDs of RAB #1 and RAB #2. There would be no list of dependent radio bearers. Also, in the same message, RAB #2 can be modified to have RAB #3 as a dependent radio bearer, and RAB #1 can be modified to have both RAB #2 and RAB #3 as dependent radio bearers.

The linking of the UMTS user plane radio bearers can allow a facilitated and automated adaptation of the radio bearer management to the current conditions.

For example, a change in measured or calculated operating characteristics for one UMTS user plane radio bearer can automatically lead to a modification of the parameter for another linked UMTS user plane radio bearer.

Specifically, if one UMTS user plane radio bearer experiences poor radio conditions such that it cannot support the UMTS user traffic, a parameter of another of the linked UMTS user plane radio bearers can be modified accordingly. Specifically, all dependent UMTS user plane radio bearers that cannot be used by the common service in the absence of the failed UMTS user plane radio bearer can also automatically be terminated.

For example, for the specific example considered above the following failure operation can be implemented:
1. RAB #1 fails. If RAB#1 fails, then both RAB #2 and RAB #3 cannot be used and they are also terminated.
2. RAB #2 fails. If RAB#2 fails, then RAB #3 cannot be used and is terminated. However, RAB #1 can still be used and is not terminated.
3. RAB #3 fails. This has no impact on other radio bearers and accordingly only RAB#3 is terminated and RAB#1 and RAB#2 are not affected.

It will be appreciated that the linking information is modified in accordance with these operations to reflect the modified conditions.

It will be appreciated that other more complex of flexible parameter modifications that are termination of the UMTS user plane radio bearer of their can be used.

For example, paralysis of the radio bearer, such as the data rate, can be modified in order to allow the existing UMTS user plane radio bearers to transport some or all of the data normally supported by the failed UMTS user plane radio bearer.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A cellular communication system comprising a network based radio bearer controller, the radio bearer controller comprising:
   means for setting up a plurality of user plane radio bearers for a user equipment, the plurality of user plane radio bearers supporting a common service; and
   means for linking the plurality of user plane radio bearers together;
   means for modifying a parameter of a first user plane radio bearer of the plurality of user plane radio bearers in response to a detection of a change in a characteristic of a second user plane radio bearer of the plurality of user plane radio bearers;
   means for the change in the characteristic of the second user plane radio bearer corresponds to a termination of the second user plane radio bearer, and wherein the modifying means comprises means for requesting a release of the first user plane radio bearer in response to a detection of a termination of the second user plane radio bearer;
   means for modifying of the parameter of the first user plane radio bearer corresponds to termination of the first user plane radio bearer.

2. The cellular communication system of claim 1 wherein the linking represents a hierarchical interrelation between the plurality of user plane radio bearers.

3. The cellular communication system of claim 1 comprising context means for setting up a packet data context for each of the plurality of user plane radio bearers, each packet data context being associated with the same Internet access point.

4. The cellular communication system of claim 3 wherein the user equipment comprises means for initiating the common service by initially requesting a first packet data context and requesting a secondary packet data context following an assignment of a primary user plane radio bearer for the first packet data context.

5. The cellular communication system of claim 4 wherein the context means is arranged to request a setup of a secondary user plane radio bearer from the radio bearer controller in response to a detection of an access point identifier for the second packet data context corresponding to an access point identifier for the first packet data context.

6. The cellular communication system of claim 5 wherein the context means is arranged to include a linking indication for the primary user plane radio bearer and the secondary user plane radio bearer in a radio bearer setup request message for the secondary user plane radio bearer.

7. A method of radio bearer management for a cellular communication system comprising a network based radio bearer controller, the method comprising at the radio bearer controller performing the steps of:
   setting up a plurality of user plane radio bearers for a user equipment, the plurality of user plane radio bearers supporting a common service;
   linking the plurality of user plane radio bearers together;
   modifying a parameter of a first user plane radio bearer of the plurality of user plane radio bearers in response to a detection of a change in a characteristic of a second user plane radio bearer of the plurality of user plane radio bearers;
   the change in the characteristic of the second user plane radio bearer corresponds to a termination of the second user plane radio bearer, and wherein the modifying comprises for requesting a release of the first user plane radio bearer in response to a detection of a termination of the second user plane radio bearer; and
   modifying of the parameter of the first user plane radio bearer corresponds to termination of the first user plane radio bearer.

* * * * *